Jan. 22, 1952  L. E. PALMER  2,583,441
APPARATUS FOR MOLDING PLASTIC LAMP RECEPTACLES
Filed July 29, 1949  3 Sheets-Sheet 1
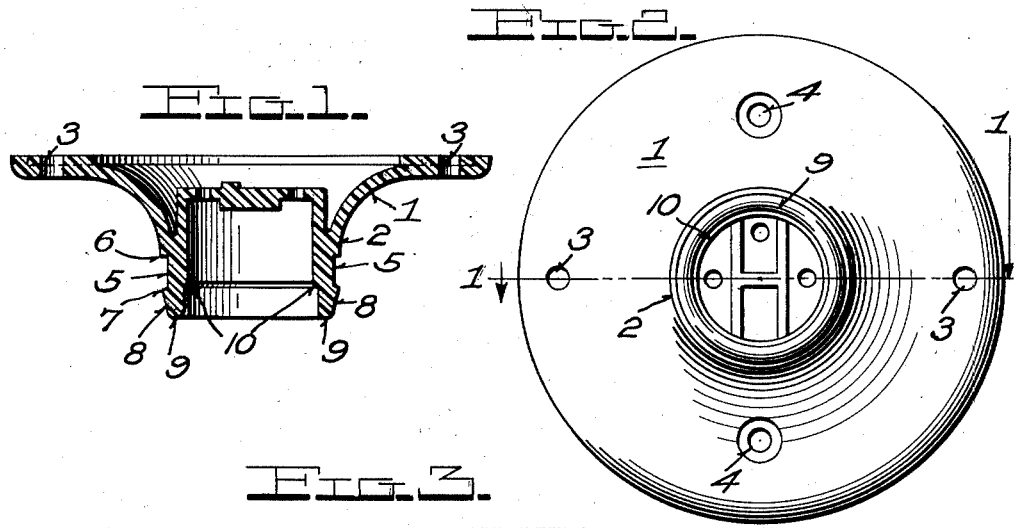
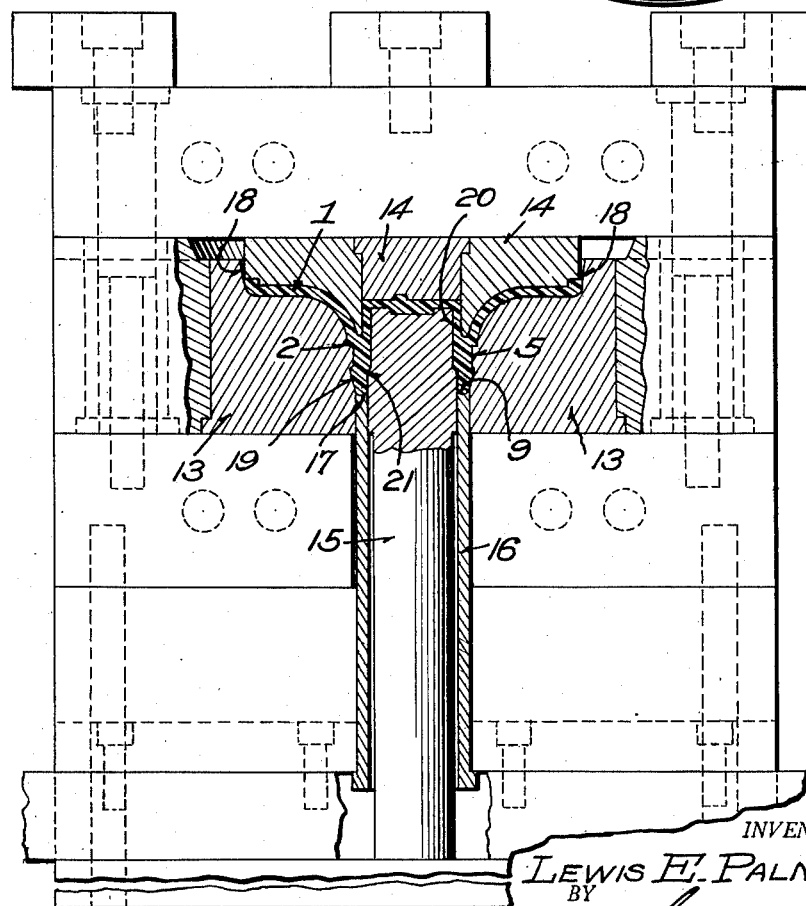
INVENTOR.
LEWIS E. PALMER,
BY
ATTORNEY

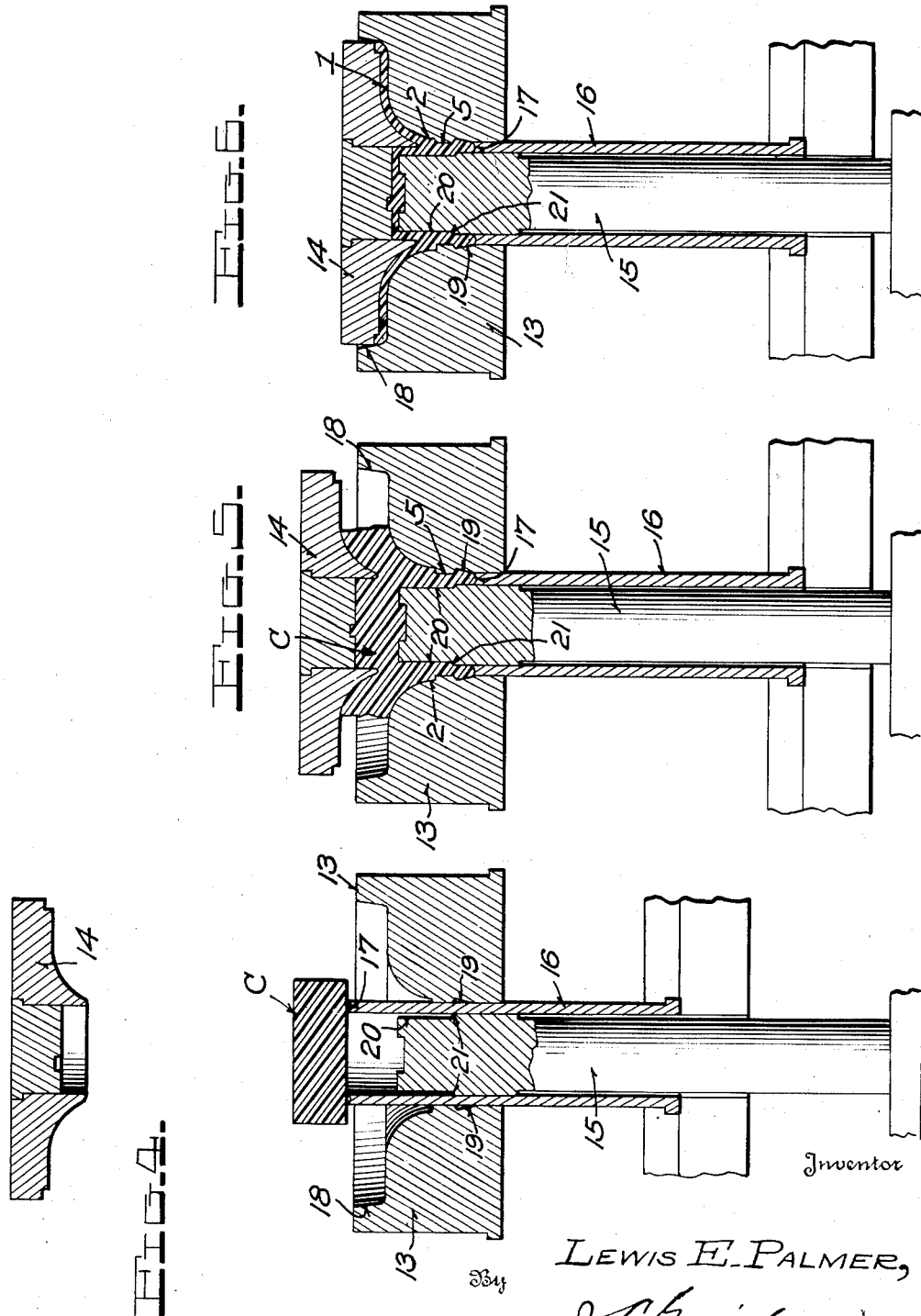

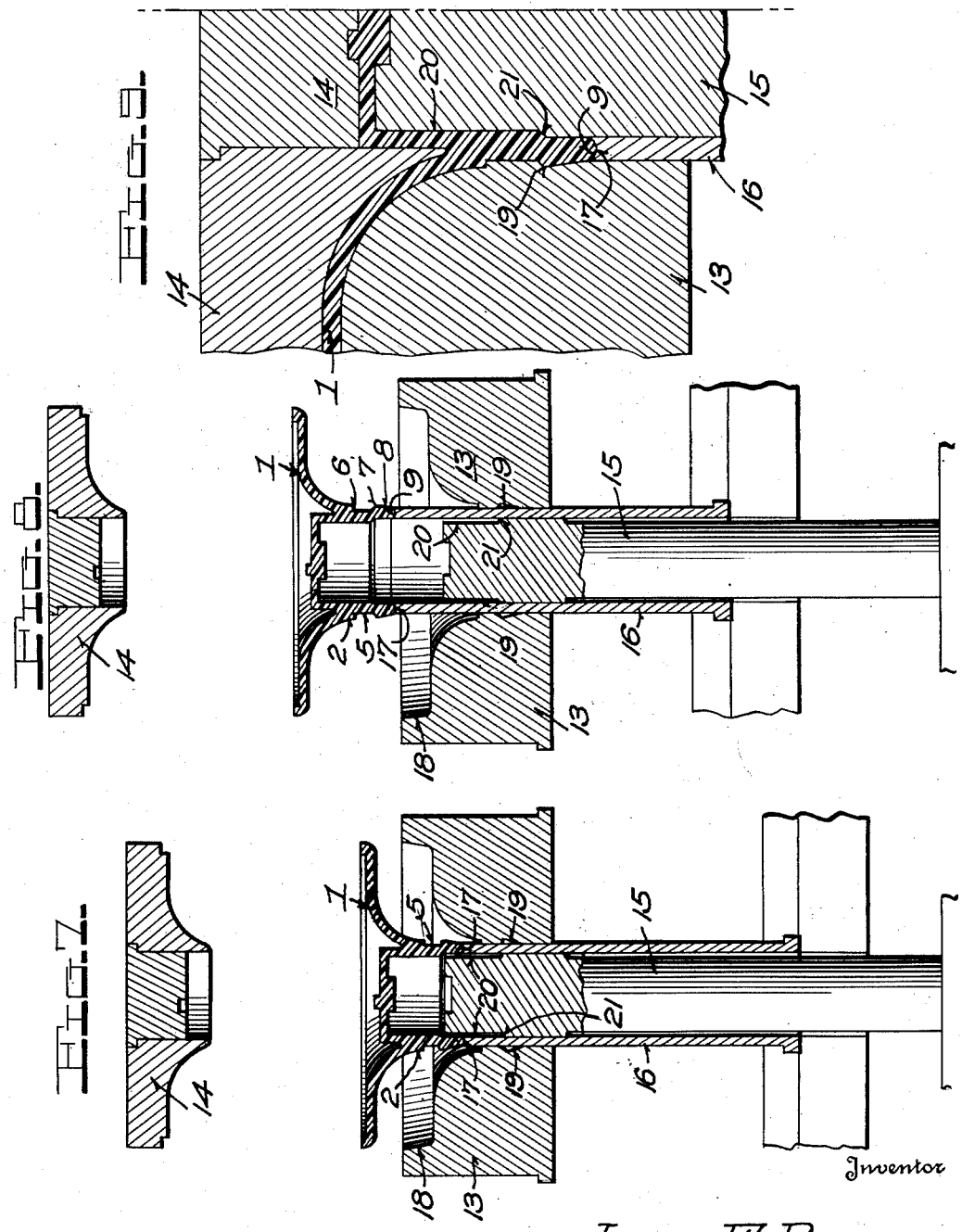

Patented Jan. 22, 1952

2,583,441

UNITED STATES PATENT OFFICE 2,583,441

APPARATUS FOR MOLDING PLASTIC LAMP RECEPTACLES

Lewis E. Palmer, Washington, W. Va., assignor to Union Insulating Co., Inc., Parkersburg, W. Va., a corporation of West Virginia Application July 29, 1949, Serial No. 107,564

2 Claims. (Cl. 18—16)

My invention relates to apparatus for molding plastic lamp receptacles or holders adapted for ceiling mounting.

Such an electric lamp receptacle has a substantially conical body to contact with a ceiling or wall and for attachment to an outlet box, the body having a central, cylindrical, sleeve-like hub containing the usual center and screw shell contacts for an Edison type lamp. For the purpose of supporting a shade for the lamp, the tubular hub or socket portion of the body is formed near its end with an external annular groove to receive the usual metallic holder for the shade or globe. Such lamp holders or receptacles have in the past been molded of porcelain and also of plastics of the synthetic resin type, but because of the external groove for the clamping band of the shade mounting device it has been necessary to use molds with sections that are retractable from the molded groove in order to release the molded receptacle. Molds having such retractable sections moving perpendicular to the press motion for molding undercuts or recesses in an article are much more complicated and expensive than those having only two opposed molding assemblies between which all portions of the article are shaped and one of which is movable toward and from the other in a straight-line movement which is parallel to the opening and closing movement of the press; and the production on such a sectional or divided die mold is much slower than when the so-called "solid die" molds are used on any standard compression molding press.

I have discovered a means for molding these lamp receptacles with an exterior annular groove for the shade holder from thermo-setting plastic material such as phenolic resin on any standard compression molding press having only two molding assemblies, the die parts of which are relatively movable only in a straight-line movement. It is known that certain thermo-setting molding materials such as phenolic resins have a temporary elasticity immediately after they are molded under heat and pressure between shaping dies and that such temporary elasticity is sufficient to permit a molded article having a slight projection or recess extending transverse to the direction of separation of the article from the mold, to be sprung out of or off of the die or dies when the two dies or molding assemblies have been separated after the molding operation. I utilize this principle in connection with a new molding die structure so that the said receptacles may be rapidly and economically produced between two molding assemblies having no laterally movable sections or die parts in any standard compression molding press. Such a compression molding press is so constructed and arranged that it will force together under suitable pressure the two platens of the press upon which the separable parts of the two molding assemblies are mounted. It will also draw these two platens apart with a lesser pressure as required to open the press after the molding operation is completed. By suitable arrangement of pull-back, this opening power of the press can be used to operate ejection pins or bushings in the molding cavity assembly or on the force punch assembly as required by the particular piece being molded. The press is operated hydraulically or mechanically, it only being necessary for the operator to move a control handle, to insert the pellets or charges of the plastic and to remove the finished molded articles. By the use of multiple die units in the two molding assemblies a number of the articles may be made at each operation of the press and hence the production is rapid and relatively inexpensive.

From the foregoing it will be seen that the object of the invention is the rapid and inexpensive production of these low-priced, plastic lamp receptacles having exterior grooves to receive the shade holders; and that object has been attained by the apparatus hereinafter described in connection with the accompanying drawings in which:

Fig. 1 is a vertical cross section on the line 1—1 of Fig. 2, through a plastic lamp receptacle molded in accordance with the invention, Fig. 2 is a front face view or elevation of the same, Fig. 3 is a diagrammatic side view of parts of a standard compression molding die means for molding a single article, with parts broken away and in section, and showing a molded lamp receptacle within the improved die structure, Figs. 4, 5, 6, 7 and 8 are diagrammatic sectional views of parts shown in Fig. 3, illustrating the successive steps or movements which the apparatus follows in the molding of the lamp receptacle, and Fig. 9 is a detail section on an enlarged scale of portions of the apparatus shown in Fig. 3.

The lamp receptacle or holder shown in Figs. 1 and 2 comprises a substantially cone-shaped body 1 in the center of which is a cylindrical sleeve-like hub 2 forming a socket for the base of the electric lamp. The hub extends from both sides of the thickness of the body 1 and its closed end has suitable openings for the attachment of the usual center contact and screw shell contact, these parts not being shown. The body may be of circular, polygonal or other shape and its hollow upper or near portion may be secured against a suitable outlet box or other support by screws or similar fastenings passed through openings 3 or 4. Formed on the exterior of the substantially cylindrical lower or outer end of the socket member or hub 2 is an annular groove 5 forming upper and lower shoulders 6 and 7 to confine the usual split and screw-connected clamping band on a metallic shade holder. The lower or outer shoulder 7 is slightly beveled or inclined from the bottom of the groove in a downward and outward direction for a purpose hereinafter described. The outer hub surface 8 below the shoulder 7 is also slightly beveled in a downward and inward direction toward the longitudinal axis of the socket and merges into the rounded end 9 of the hub. The bore or recess in the hub is also slightly enlarged opposite the beveled exterior portion 8 to form an internal annnular shoulder 10 which is substantially opposite the shoulder 7.

The above described lamp receptable may be molded in one piece from a phenolic resin or similar thermo-setting plastic between upper and lower molding assemblies relatively movable in a straight line on a standard compression molding press. The press includes a lower stationary horizontal platen and an upper vertically movable platen, the movable platen being moved by hydraulic means under manual control. The lower molding assembly includes a main die part 13 suitably secured to the lower platen and having a die cavity which shapes the front exterior surface of the receptacle. The upper or rear surface of the receptacle is shaped by a solid die punch 14 suitably secured to the upper platen and forming the upper molding assembly. For convenience in manufacture the die 14 is made of two pieces as shown, but it may be made in one piece. The cavity or socket in the hub 2 is shaped by a core-like die 15 which forms a part of the lower molding assembly and which is fixed to the lower portion of the press and extends into the molding cavity through a central opening in the die part 13. The lower assembly also includes an ejector 16 which may be in the form of pins but which preferably is a cylindrical bushing which surrounds the core part 15. The ejector bushing is slidably vertically as will be seen upon reference to Figs. 4 through 8. The upper end of the ejector bushing as shown is formed with a concave recess 17 which shapes the rounded end 9 of the hub 2. The bushing is attached to an ejector plate which remains stationary relative to the lower platen until the opening of the press, the press has completed a portion of its opening movement at which time suitable ejection rods move the bushing vertically with respect to the parts 13 and 15, ejecting the molded article from them.

The periphery of the upper molding assembly or force punch 14 enters the molding cavity in the main die part 13 in the molding operation as shown in Figs. 3 and 6, and the upper edge of said cavity is flared outwardly as at 18 to permit any surplus of the molding charge to escape from between the two assemblies. It will be noted that there is an annular recess or undercut 19 formed in the wall of the cavity of the lower die part 13 to shape the shoulder 7 and beveled portion 8 of the hub 2; and that the cylindrical core part 15 has its upper portion 20 reduced in diameter thereby forming an annular beveled shoulder 21 disposed substantially opposite the portion of the recess 19 which shapes the shoulder 7. By thus reducing the diameter of the portion 20 of the core 15, it is possible for the ejector bushing 16 to eject the molded receptacle while it is still hot and elastic even though the molded material fills the under-cut portion 19 of the lower assembly.

The operation will be apparent upon reference to Figs. 4 through 8. When the press is in its open position shown in Fig. 4 the top of the bushing 16 extends up into or above the cavity in the die part 13. A charge of the molding material preferably in the form of a pellet or cake C is placed between the two assemblies on the top of the bushing and the press is then closed. As the press starts to close the bushing returns to its lower position shown in Fig. 5. The latter shows the force punch 14 lowered into contact with the pellet and starting to spread the material. Fig. 6 shows the two assemblies in closed position having formed the receptacle. After a proper time interval the operating mechanism is actuated to cause the press to open. Fig. 7 shows the force punch 14 and ejector bushing in partially raised positions, the bushing having moved the molded article partially out of the cavity in the die part 13. Fig. 8 shows the press fully opened to the position shown in Fig. 4, and the molded receptacle supported on the top of the bushing above the cavity ready for removal from the press. The opening mechanism of the press is not operated until the molded article has had sufficient time to cure so that it retains the shape given it by the molding assemblies as shown in Fig. 6. However at that stage in the molding operation the material has some resilience or elasticity and by providing the core section of the lower molding assembly with the reduced portion 20 extending upwardly from a point opposite the under-cut recess 19, ample area or space is allowed for the passage of the material molded in the recess 19, since the elasticity allows the material to be ejected by merely temporarily deforming inward from its molded position without having the effect of extruding it into a longer length as would be done were there no reduction in the core section. As soon as the material below the shoulder 7 of the molded article passes above the shoulder 21 on the core part, it springs outwardly to its molded shape and there is no permanent deformation of the article. While the same result may be obtained with a core section that does not have a reduced upper end, by lowering the top of the core section below the recess 19 before the bushing moves upwardly to eject the molded article, such would be a more complicated operation not so well adapted to the standard molding press. By the simple means of reducing the upper portion of the core part to allow ample area for the passage of the molded projection, I am able to mold these lamp receptacle on the standard molding press with shoulders 7 sufficiently wide to effectively retain the clamping bands of shade holders in the grooves 5 of the receptacles. The provision of the bevel on the shoulder 7 and the bevel on the surface 8 aids in the molding of a deeper under-cut or groove 5 but these bevels may be omitted making the shoulder 7 right-angular and the portion 8 cylindrical.

While I have specifically described the preferred means for practicing the invention, it will be understood that minor variations may be made within the scope of the following claims.

I claim:

1. An apparatus for molding from phenolic resin or similar thermo-setting plastic material, a lamp receptacle having a continuous-walled tubular socket portion with an annular external groove to receive a shade holder, said apparatus comprising upper and lower molding assemblies relatively movable in a straight line movement and between which all parts of the receptacle are molded, one of said assemblies being provided with a die part having a mold cavity with annular under-cut recess in its wall and being also provided with a cylindrical core part projecting into the cavity in fixed relation therewith, said core part being reduced in diameter from a point opposite said recess to the extremity of said core part, and means for ejecting the molded receptacle while it is hot and elastic from said assembly having the core part and the die part with the under-cut recess in its cavity after the two assemblies are separated, whereby the material in and opposite said under-cut recess will temporarily deform inwardly around the reduced portion of said core part during the ejection of the receptacle.

2. In an apparatus for molding from phenolic resin or similar thermo-setting plastic material a lamp receptacle having a continuous-walled socket portion with an annular external shade-holder groove adjacent its open end, a molding assembly for shaping the front exterior surface of the receptacle and the interior of its socket portion; said molding assembly comprising a main die part with a central circular opening surrounded by a molding cavity, a cylindrical core part arranged in said opening in spaced relation thereto and extending into said cavity, said die part having in the wall of its cavity an annular under-cut recess, said core part being fixed relative to said die part and being of reduced diameter from a point opposite said recess to the end of said core part, and a tubular ejector bushing surrounding said core part and slidable in the space between the latter and the wall of said opening in the die part, an end of said bushing being shaped to form the end of said socket portion of the receptacle, said bushing being slidable in one direction to eject from said assembly the molded receptacle while it is hot and elastic, thereby causing the material in and opposite said under-cut recess to be temporarily deformed inwardly around said reduced portion of said core part during the ejection of the receptacle.

LEWIS E. PALMER.

REFERENCES CITED

The following references are of record in the file of this patent:

UNITED STATES PATENTS

| Number | Name | Date |
| --- | --- | --- |
| Re. 19,000 | Scribner | Nov. 14, 1933 |
| 1,589,913 | Wells | June 22, 1926 |
| 1,679,338 | Rothenberg et al. | July 31, 1928 |
| 2,402,287 | Kearns | June 18, 1946 |

OTHER REFERENCES

Tennessee Eastman Cor.—"Injection Mound Design" British Plastics and Moulded Products Trader—October 1940—pages 147–156; 18—I. M. Dig.